United States Patent [19]

Ahearn

[11] 3,835,414

[45] Sept. 10, 1974

[54] GALLIUM ARSENIDE ARRAY

[75] Inventor: William E. Ahearn, Purny Station, N.Y.

[73] Assignee: The United States of America as represented by the Secretary of the Air Force, Washington, D.C.

[22] Filed: Mar. 24, 1972

[21] Appl. No.: 238,708

[52] U.S. Cl. .................................. 331/94.5
[51] Int. Cl. .................................. H01s 3/02
[58] Field of Search .................................. 331/94.5

[56] References Cited

UNITED STATES PATENTS 3,704,427 11/1972 Heywang .................. 331/94.5 D

*Primary Examiner*—Richard A. Farley
*Assistant Examiner*—N. Moskowitz
*Attorney, Agent, or Firm*—Harry A. Herbert, Jr.; J. L. Siegel

[57] ABSTRACT

A gallium arsenide laser array in which laser modules are mounted on a printed circuit support plate. Each module has a housing creating a cavity and shaped substantially as a pair of cones with opposing vertices. At the junction of the vertices there is a stack of gallium arsenide diode chips each of the chips being mounted on a heat sink with dielectric spaces therebetween. Each module has a spherical mirror positioned to reflect the laser beam through openings in the support plate. A lens array is mounted with support rods to the support plate with each lens of the array corresponding to a laser module.

3 Claims, 6 Drawing Figures

GALLIUM ARSENIDE ARRAY

BACKGROUND OF THE INVENTION

This invention relates to lasers and more particularly to an array of gallium arsenide diodes.

There has been a need for gallium arsenide laser diodes that can produce higher peak power than has been available in the past. The present invention offers a novel and improved array that can obtain kilowatts of peak power at room temperature and at the same time offer an array with low source impedance which facilitates modulation.

SUMMARY OF THE INVENTION

An array of gallium arsenide laser diodes are constructed so that kiolwatts of peak laser power can be produced at room temperature from a reasonably sized aperture. In addition, this compact construction allows the array to have a low source impedance, thus making it easy to modulate and also enhances its thermal properties. The laser module mounting plate utilizes a printed circuit to supply the current to the modules. The substrate material provides support, electrical insulation and thermal dissipation. With a minimal design change, the substrate can house a closed cooling system or be provided with cooling fins over which a coolant could flow.

It is therefore an object of this invention to provide a novel gallium arsenide laser diode array.

It is another object to provide a laser diode array that can produce kilowatts of power at room temperature without using a large aperture.

It is still another object to provide a laser diode array that has a low source impedance thus facilitating modulation.

These and other objects, advantages and features of the invention will become more apparent from the following description when taken in connection with the illustrative embodiment in the accompanying drawings.

DETAILED DESCRIPTION OF THE PREFERRED EMBODIMENT

Figures 1, 4, 5:
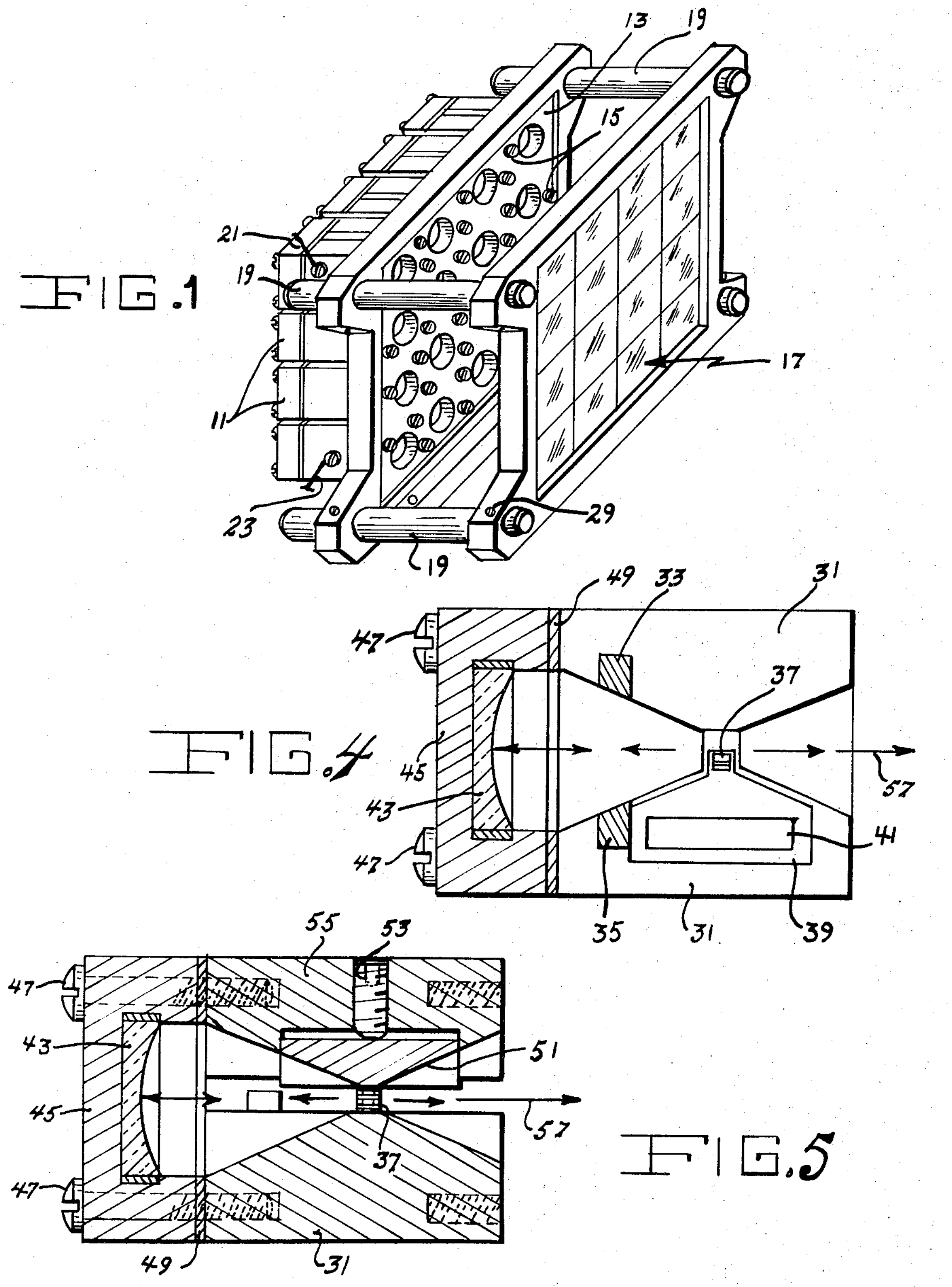
FIG. 1 is a perspective view of the gallium arsenide laser array.
FIG. 4 is a sectional elevation view of a gallium arsenide laser module.
FIG. 5 is a sectional plan view of a single gallium arsenide laser module.

A gallium arsenide array is shown in FIG. 1 and has the capability of producing 10 to 16 kilowatts into a square beam having a 2° divergence. Laser modules 11 are mounted directly and aligned on support plate 13 by use of screws 15. Field lens array 17 is aligned to laser modules 11 by support rods 19. The optical axis of the lens array is designed to pass through the center of the plate aperture. The laser diode subarrays are displaced slightly from the optical axis and are placed at the center of curvature of spherical mirrors (not shown in FIG. 1). The optical axis is common to both the field lens and spherical mirrors. The array is designed in modular form, thus any $m \times n$ matrix of modules can be formed for the array. However, the array shown here is a $3 \times 4$ matrix. The electrical current is passed on to the modules from appropriate circuitry over the face of the support plate 13 by contact leads 21 and 23. The current paths are determined by the conduction pattern placed on the plate face. Oxygen free high conductivity copper can be used in the construction of the modules and the support plate. Gold plating is used to eliminate the formation of copper oxides and to provide a good electrical and thermal contact between the modules and the support plate interface.

Figure 2:
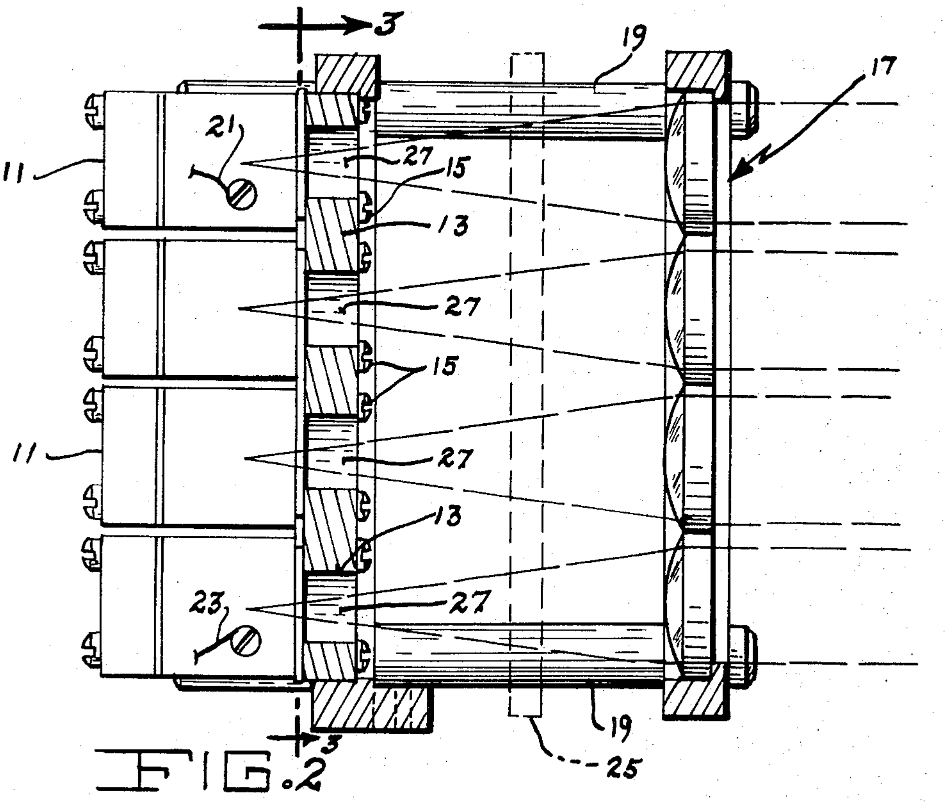
FIG. 2 is a sectional elevation view of the gallium arsenide laser array.

FIG. 2 shows a side view of the array structure. Electrical contact can be made directly to appropriate modules 11 or to support plate 13. Optical baffle 25 can be used to reduce cross talk between lenticular lens array 17 and laser modules 11 as shown. Cross talk occurs when the optical output from a laser module enters a lens element of the array other than the one designated for it. For a low $f$ number lens system, this effect can be minimized. The optical divergence of the laser array output must also be considered, and is normally matched to the $f$ number.

Figure 3:
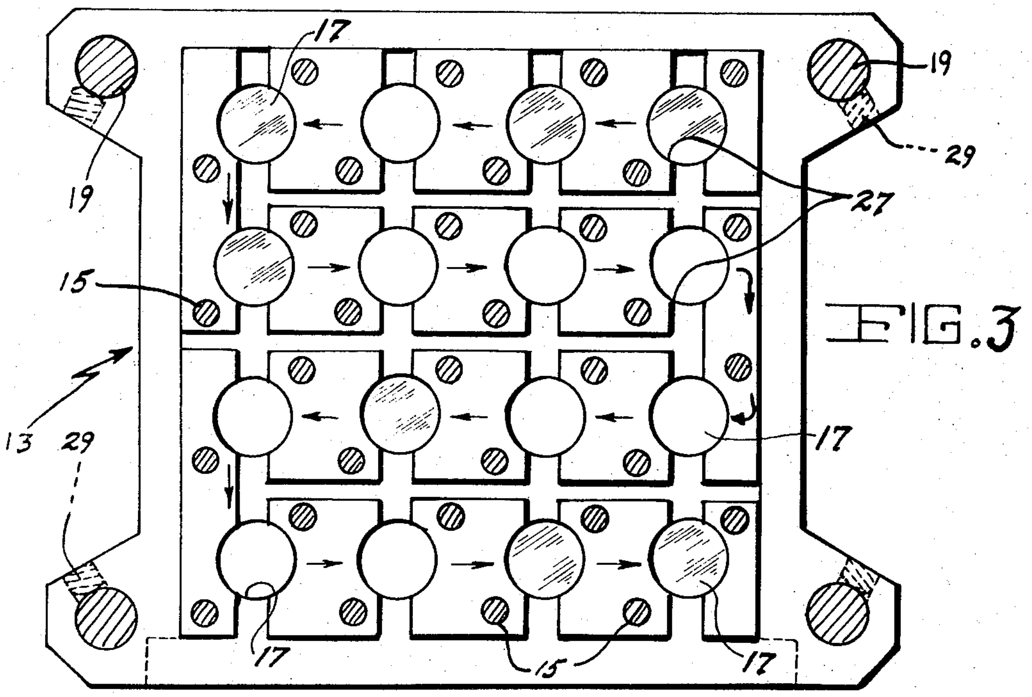
FIG. 3 is a sectional view of the printed circuit support plate taken at 3—3 of FIG. 2.

FIG. 3 shows support plate 13 onto which the modules are placed in alignment with openings 27. The arrows show the current paths through the modules. The actual conducting area is quite large which offers a low impedance path for the high frequency or nanosecond current pulses necessary to drive the laser modules. Support plate 13 can be adjusted on rods 19 and secured by screws 29.

Referring to FIG. 4, there is shown a sectional elevation view of a module that shows one side that has a lower header 31 together with guides 33 and 35. A stack of gallium arsenide diodes are placed in the cavity which has a double conical configuration. Single diode 37 is shown mounted upon heat sink 39 which has a half-H configuration. Also mounted on heat sink 39 is dielectric spacer 41. The laser beam is projected in two directions as shown by the arrows. In the rear direction the beam is reflected by spherical mirror 43 enclosed by housing 45 which is secured to the headers by insulating screws 47. Gasket 49 is mounted between mirror housing 45 and the headers.

Mirror housing 45 is black anodized and electrically isolated from the laser array headers. Special 10 mil wall shrinkable tubing can be of a specified length and can be used as insulation for the screws.

A front view of the laser module is shown in FIG. 5. The location of the laser array is positioned with respect to the center line or optical axis 57. It is the image of the rear faces and the actual front face that form the overall or effective source size. As far as the field lens is concerned, the laser radiation from the effective source size determines the overall array beamwidth. Pressure pad 51 is essential to make good electrical and thermal contact to the laser array and is controlled by screw 53. A minimum pressure of a thousand atmospheres is normally required.

The laser diodes are placed in the region that juts out. The end headers (not shown) can be 5 mils thick and indium plated. The headers or heat sinks 39 in the rest of the array are 1 mil thick and also indium plated. Both can be made from OFHC copper that has been flattened. The heat sink is designed specifically for array applications. Dielectric spacers 41 provide electrical isolation of the heat sink or headers. Various materials, such as sapphire, insulating gallium arsenide, anodized aluminum with proper epoxy or thermal adhesives can be used for the spacers.

Figure 6:
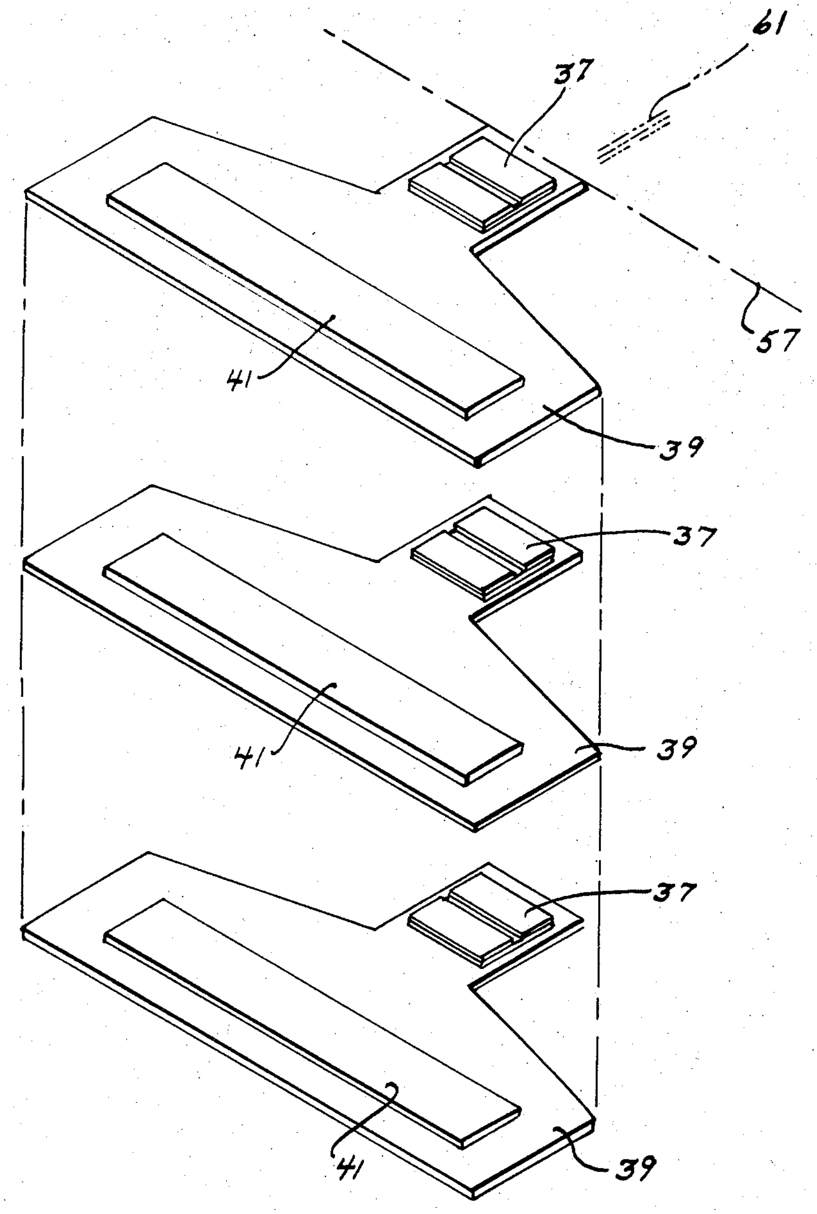
FIG. 6 is a partially exploded view of the laser stack.

FIG. 6 shows a schematic of laser diodes 37, spacers 41 and heat sinks, and shows image 61. This is not truly to scale, because the diode is placed closer to the heat sink edge. Large thin laser diodes with a periodic break in the junction are used. The break in the junction is formed by using a string saw or employing standard etching techniques. This break is necessary to suppress off-axis moding internal to the laser cavity. Normally this cut is every 10 mils of linear laser junction width. Diodes 20 mils square and 2 mils thick with a junction break in the center are ideal for array use. They offer a lower driving impedance and can be easily driven without resorting to exotic driver electronics. By making them thin, higher packing densities can be achieved. This means junctions can be placed on 3 mil centers. This structure can be for heterostructure gallium arsenide lasers as well as the conventional devices.

What is claimed is:

1. An array of gallium arsenide lasers comprising:

a. a support plate substantially rectangular having a plurality of openings;

b. a plurality of laser modules mounted upon the support plate and aligned with the plurality of openings each of the modules including, 1. an upper header,
2. a lower header in opposition to the upper header and forming with the upper header a cavity having a substantial configuration of a pair of cones with the vertices thereof in juxtaposition and the axes of the cones in longitudinal alignment,
3. a stack of gallium arsenide laser diodes positioned at the junction of the pair of cones,
4. a housing mounted upon the upper and lower header and having an opening facing the base of one of the cones, and
5. a spherical mirror mounted within the housing for reflection of the laser beam;

c. a printed circuit affixed to the support plate for electrical activation of the modules;

d. support rods extending from the corners of the support plate; and e. an array of lenses mounted on support rods each of the lenses of the array corresponding to one laser module.

2. An array of gallium arsenide lasers according to claim 1 where the laser stacks comprise:

a. a series of overlying heat sinks;

b. a series of gallium arsenide diode chips mounted one each on the heat sinks; and c. a series of dielectric spacers mounted one each upon the heat sinks and adjacent to the diode chips.

3. An array of gallium arsenide lasers according to claim 2 which further comprises an optical baffle interposed between the support plate and the array of lenses.

* * * * *